US010766445B2

(12) United States Patent
Huelke et al.

(10) Patent No.: US 10,766,445 B2
(45) Date of Patent: Sep. 8, 2020

(54) VEHICLE AIRBAG

(71) Applicant: Ford Global Technologies, LLC, Dearborn, MI (US)

(72) Inventors: David R. Huelke, Milan, MI (US); Eric Axel Smitterberg, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 16/166,269

(22) Filed: Oct. 22, 2018

(65) Prior Publication Data

US 2020/0122664 A1    Apr. 23, 2020

(51) Int. Cl.
*B60R 21/00*       (2006.01)
*B60R 21/205*     (2011.01)
*B60R 21/16*       (2006.01)

(52) U.S. Cl.
CPC ............ *B60R 21/00* (2013.01); *B60R 21/205* (2013.01); *B60R 2021/0032* (2013.01); *B60R 2021/162* (2013.01)

(58) Field of Classification Search
CPC ..... B60R 21/00; B60R 21/205; B60R 21/206; B60R 21/215; B60R 21/2165; B60R 2021/0032; B60R 2021/162
See application file for complete search history.

(56) References Cited

U.S. PATENT DOCUMENTS

| 5,588,674 | A | * | 12/1996 | Yoshimura | B60R 21/16 280/728.1 |
|---|---|---|---|---|---|
| 5,653,464 | A | | 8/1997 | Breed et al. | |
| 6,131,944 | A | * | 10/2000 | Henkel | B60R 21/16 280/728.3 |
| 7,770,925 | B2 | * | 8/2010 | Seymour | B60R 21/201 280/728.2 |
| 7,878,534 | B2 | * | 2/2011 | Kumagai | B60R 21/231 280/731 |
| 8,276,936 | B2 | * | 10/2012 | Shimizu | B60R 21/201 280/728.2 |
| 8,764,055 | B2 | | 7/2014 | Fischer et al. | |
| 2007/0057487 | A1 | * | 3/2007 | Kim | B60R 21/20 280/728.2 |
| 2009/0254003 | A1 | * | 10/2009 | Buckman | A61B 5/1117 600/595 |
| 2016/0221526 | A1 | * | 8/2016 | Santin Navarro | B60R 21/213 |

FOREIGN PATENT DOCUMENTS

| DE | 10001246 B4 | 12/2005 |
|---|---|---|
| EP | 1393994 A1 | 3/2004 |
| JP | 6344845 A | 12/1994 |
| JP | 4364116 B2 | 8/2009 |

* cited by examiner

*Primary Examiner* — Frank B Vanaman
(74) *Attorney, Agent, or Firm* — Frank A. MacKenzie; Bejin Bieneman PLC (57) ABSTRACT

An airbag assembly includes a housing and an airbag supported by the housing. A sheet includes a first end fixed relative to the housing and a second end. A reinforcement is elongated on the sheet. The sheet is deployable below the airbag with the second end free from the airbag.

9 Claims, 8 Drawing Sheets

VEHICLE AIRBAG

BACKGROUND

Vehicles are equipped with a restraint system to control the kinematics of occupants inside the vehicle. The restraint system includes airbag assemblies that deploys in a passenger cabin. One type of airbag assembly is a passenger airbag assembly positioned in front of a front passenger. For an occupant seated in an upright position, the passenger airbag assembly receives the head and torso of the occupant during a vehicle impact that urges the passenger in a vehicle-forward direction.

DETAILED DESCRIPTION

A system includes an instrument panel elongated along an axis and an airbag supported by the instrument panel. The system includes a sheet including a first end fixed relative to the instrument panel and a second end and a reinforcement on the sheet. The sheet is deployable below the airbag with the second end free from the airbag and the reinforcement elongated along the axis.

The reinforcement is spaced from the first end and the second end. The reinforcement is substantially parallel to the first end.

The sheet is elongated in a direction from the first end to the second end.

The reinforcement includes a pleat on the sheet. The system includes a row of stitches between the pleat and the sheet.

The pleat defines a pocket and a spine is in the pocket. The spine is rigid relative to the sheet. The spine is polymeric.

The airbag includes an inflation chamber and the sheet is external to the inflation chamber.

The airbag includes a panel defining an inflation chamber and the sheet is external to the inflation chamber and abuts the panel.

An airbag assembly includes a housing and an airbag supported by the housing. The airbag assembly includes a sheet including a first end fixed relative to the housing and a second end and a reinforcement that is elongated on the sheet. The sheet is deployable below the airbag with the second end free from the airbag.

The reinforcement is spaced from the first end and the second end. The reinforcement is substantially parallel to the first end.

The reinforcement includes a pleat on the sheet. The airbag assembly includes a row of stitches between the pleat and the sheet.

The pleat defines a pocket and a spine is in the pocket. The airbag includes an inflation chamber and the sheet is external to the inflation chamber.

The airbag includes a panel. The panel defines an inflation chamber and the sheet is external to the inflation chamber and abuts the panel.

With reference to the Figures, wherein like numerals indicate like parts throughout the several views, a system 10 of a vehicle 12 includes an instrument panel 14 elongated along an axis L. An airbag 16 is supported by the instrument panel 14. The system 10 includes a sheet 18 including a first end 20 fixed relative to the instrument panel 14 and a second end 22. The system 10 includes a reinforcement 24 on the sheet 18. The sheet 18 is deployable below the airbag 16 with the second end 22 free from the airbag 16 and the reinforcement 24 elongated along the axis L.

Figure 1:
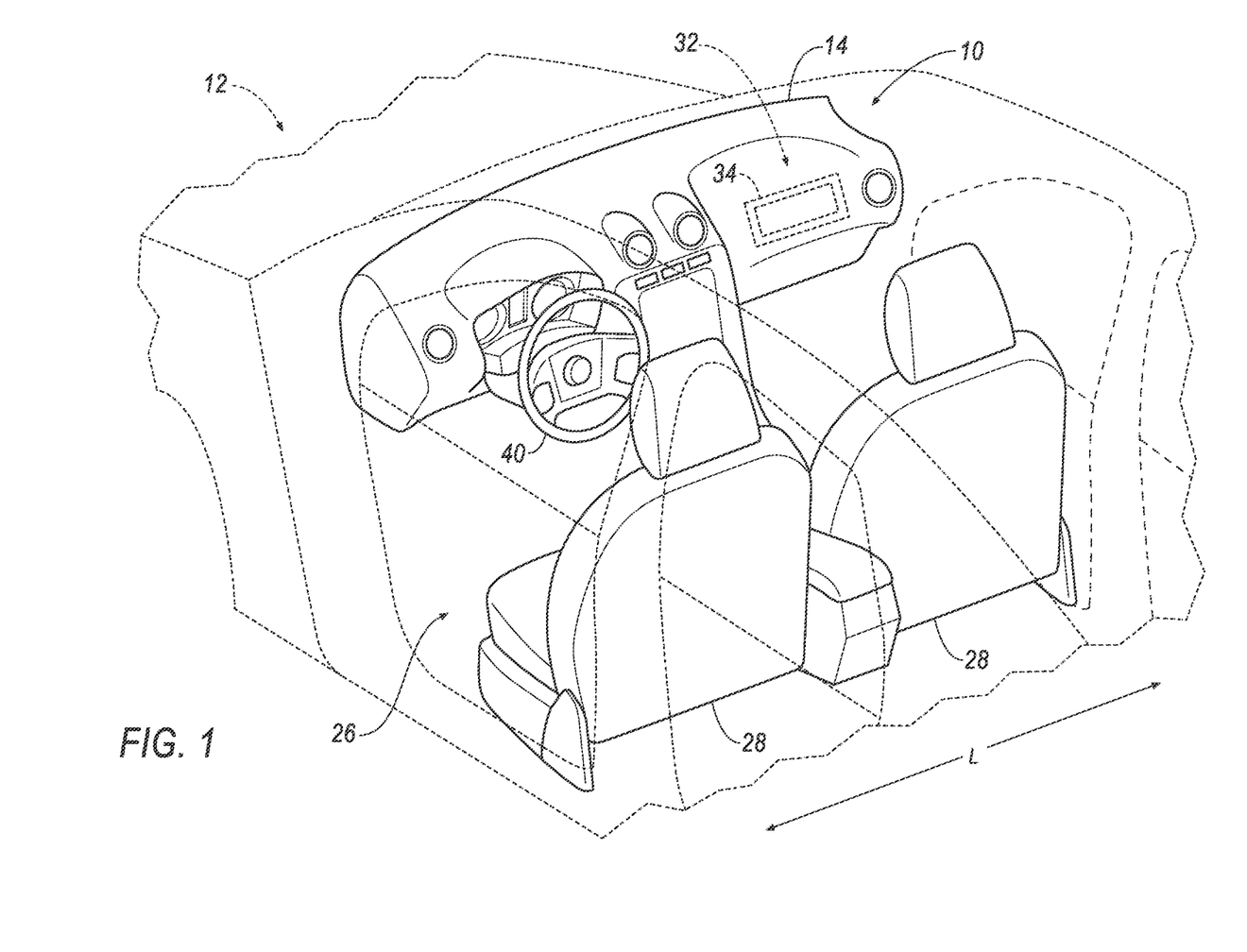
FIG. 1 is a perspective view of a vehicle with an airbag assembly in an uninflated position.
Figure 2:
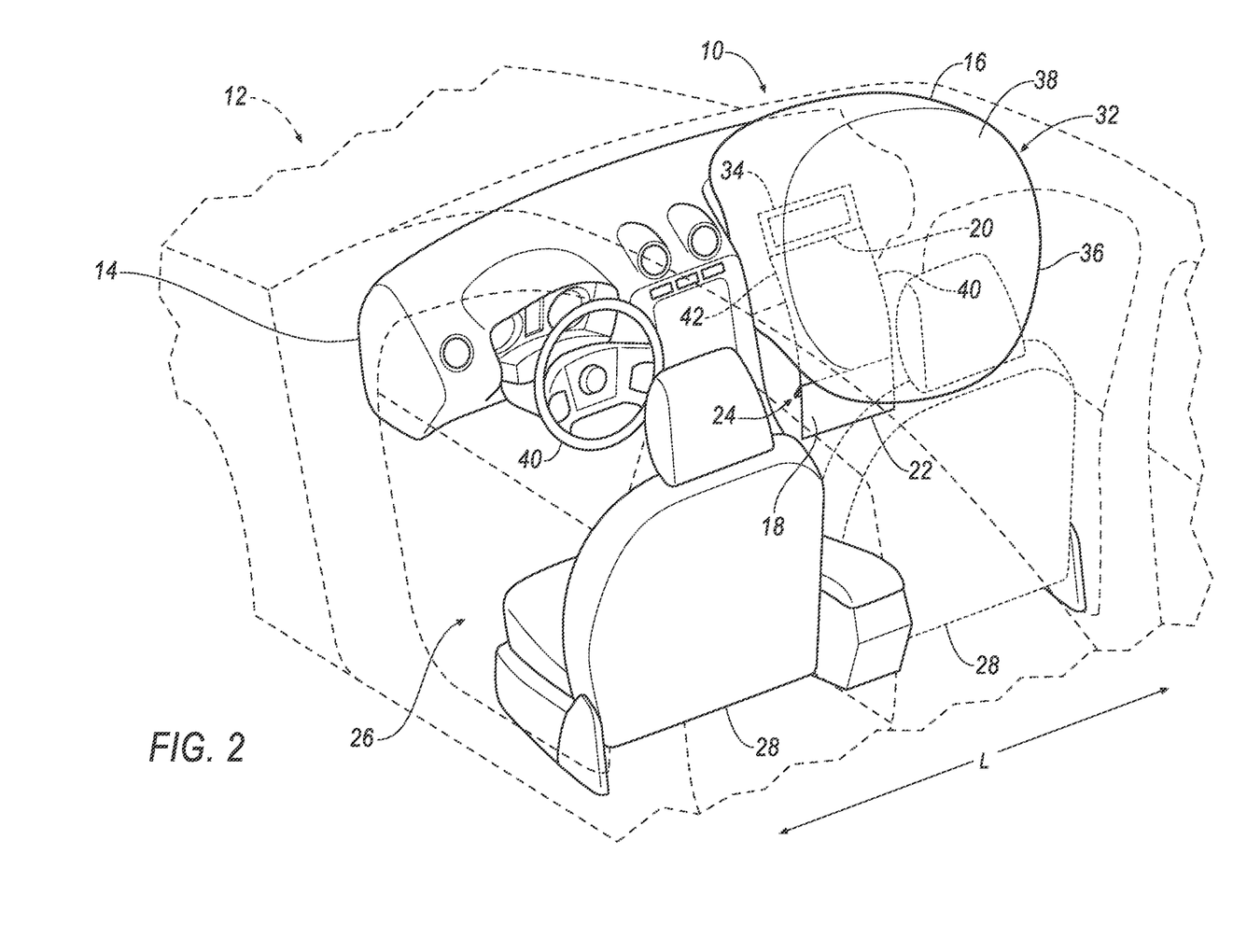
FIG. 2 is a perspective view of the vehicle with the airbag assembly in an inflated position.

During a vehicle 12 impact, the airbag 16 inflates from an uninflated position (shown in FIG. 1) to an inflated position (shown in FIG. 2). In the event the occupant is seated in an upright position and urged in a vehicle-forward direction toward the airbag 16, the head and/or torso of the occupant impacts the airbag 16 and the airbag 16 controls the kinematics of the occupant. In the event that the occupant is out of position, for example if the occupant is leaning forward in the seat and/or is close to the instrument panel 14, the sheet 18 deploys over the occupant to guide the airbag 16 above the occupant. The reinforcement 24 resists bunching of the sheet 18 along the axis L. This encourages a flat surface-to-surface interaction between the sheet 18 and the airbag 16 to distribute friction between the sheet 18 and the airbag 16 and to reduce areas of concentrated friction between the sheet 18 and the airbag 16.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 12 includes a passenger cabin 26 to house occupants, if any, of the vehicle 12. The passenger cabin 26 includes one or more front seats 28 disposed at a front of the passenger cabin 26. The passenger cabin 26 may include one or more back seats disposed behind the front seats 28. The position and orientation of the seats and components thereof may be adjustable by an occupant.

The instrument panel 14 may be disposed at a forward end of the passenger cabin 26 and face toward the front seats 28. The instrument panel 14 may include vehicle controls, including a steering wheel. As set forth above, the instrument panel 14 is elongated along the axis L. The axis L extends along a cross-vehicle direction.

The system 10 includes an airbag assembly 32. The airbag assembly 32 may include the airbag 16 and the sheet 18. As shown in FIG. 1, the airbag assembly 32 may be supported by the instrument panel 14. Specifically, the airbag assembly 32 may be in the instrument panel 14 in the uninflated position and the airbag 16 may extend from the instrument panel 14 in the inflated position. The airbag 16 assembly shown in the Figures, for example, is a passenger airbag assembly. As other examples, the airbag assembly may be disposed in another vehicle component, for example a seat, a door, a vehicle ceiling, etc.

The airbag assembly 32 may include a housing 34. The housing 34 may be supported by the instrument panel 14. Specifically, the housing 34 may be fixed to the instrument panel 14, e.g., by fasteners. The housing 34 may be a rigid polymer, a metal, a composite, etc. The airbag 16 and the sheet 18 may be disposed in housing 34 in the uninflated position and may be supported by the housing 34 in the inflated position.

The airbag assembly 32 includes an inflator 30 connected to the airbag 16. Upon receiving a signal from, e.g., a computer (described below), the inflator 30 inflates the airbag 16 with an inflatable medium, such as a gas. The inflator 30 may be, for example, a pyrotechnic inflator that uses a chemical reaction to drive inflation medium to the airbag 16. The inflator 30 may be of any suitable type, for example, a cold-gas inflator.

The vehicle 12 may include a communication network. The communication network includes hardware, such as a communication bus, for facilitating communication among vehicle components, e.g., the inflator 30, an occupancy sensor, an impact sensor, the computer, etc. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer may be a microprocessor-based computing device implemented via circuits, chips, or other electronic components. For example, the computer may include a processor, memory, etc. The memory of the controller may store instructions executable by the processor as well as data and/or databases.

The memory may store instruction executable by the processor to detect and identify an impact to the vehicle 12. The computer may identify whether the vehicle 12 has received an impact to one of the sides, e.g., an oblique or side impact to the first side or the second side of the vehicle 12. The computer may identify an amount of such impact. The computer may make such identifications based on information received from the impact sensor via the communication network.

The memory may store instruction executable by the processor to inflate the airbag 16. For example, the computer may transmit an instruction to the inflator 30, e.g., in response to detecting a vehicle 12 impact.

In the example shown in the Figures, the airbag 16 expands upwardly and rearwardly from the instrument panel 14 toward the front seat 28 when inflating from an uninflated position to an inflated position. The airbag 16 in the Figures, for example, is a passenger airbag. As other examples, the airbag 16 may be any suitable type of airbag 16.

The airbag 16 includes a panel 36. The panel 36 may be a single woven panel of fabric or may include a plurality of panels affixed together, e.g., by stitching, adhesive, etc. The panel 36 defines an inflation chamber 38. The inflator 30 inflates the inflation chamber 38 with inflation medium, as described above.

The sheet 18 is supported by the housing 34, i.e., in the uninflated position and in the inflated position. In the uninflated position, the sheet 18 may be positioned in the housing 34 such that the sheet 18 deploys from the housing 34 before the airbag 16 as the airbag 16 deploys to the inflated position. In other words, the movement of the airbag 16 to the deployed position moves the sheet 18 to the deployed position. The sheet 18 may also be referred to as a partial low risk deployment (PLRD) flap.

Figure 3A:
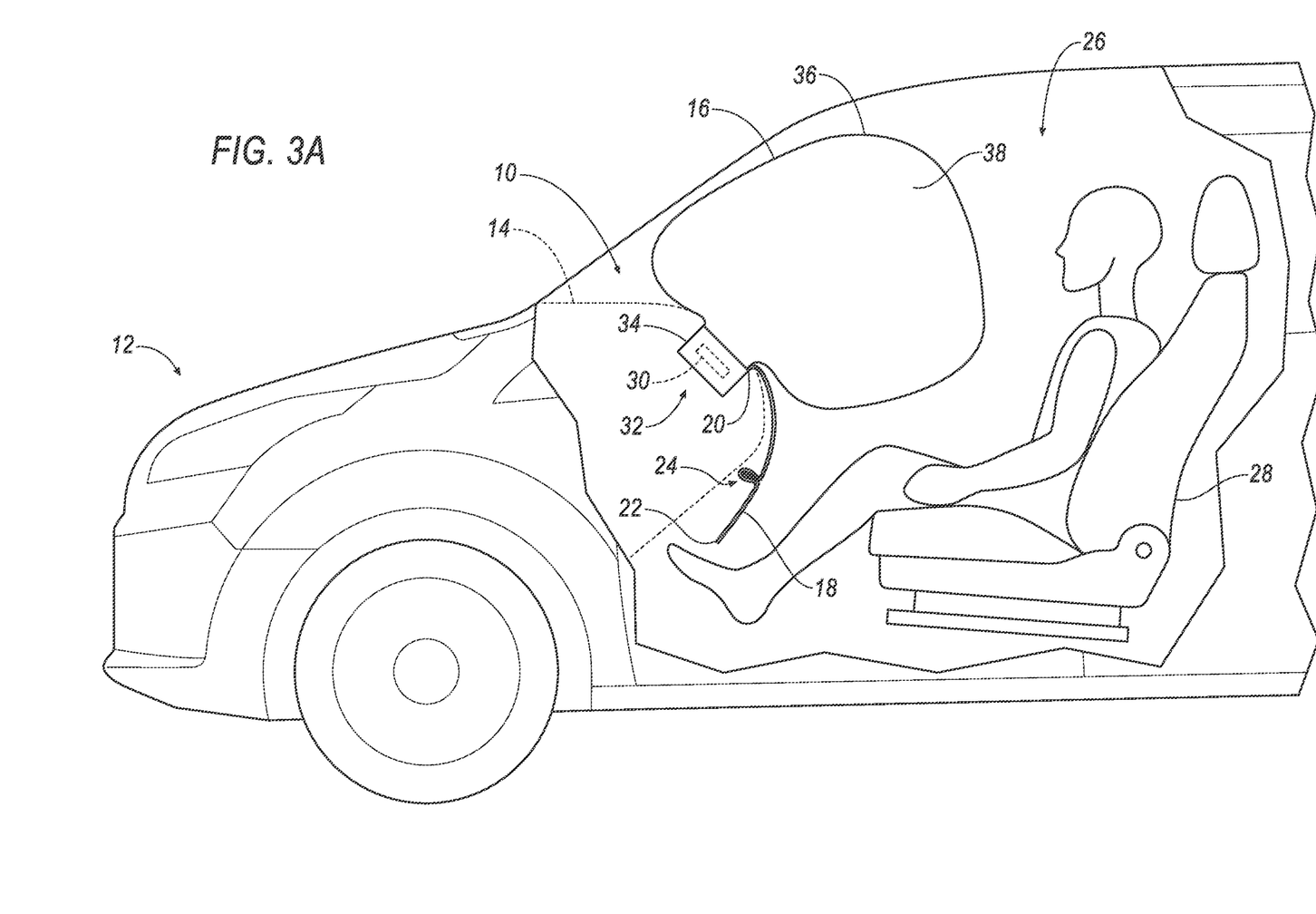
FIG. 3A is a side view of the vehicle with the airbag assembly in the inflated position and the occupant in an upright position.
Figure 3B:
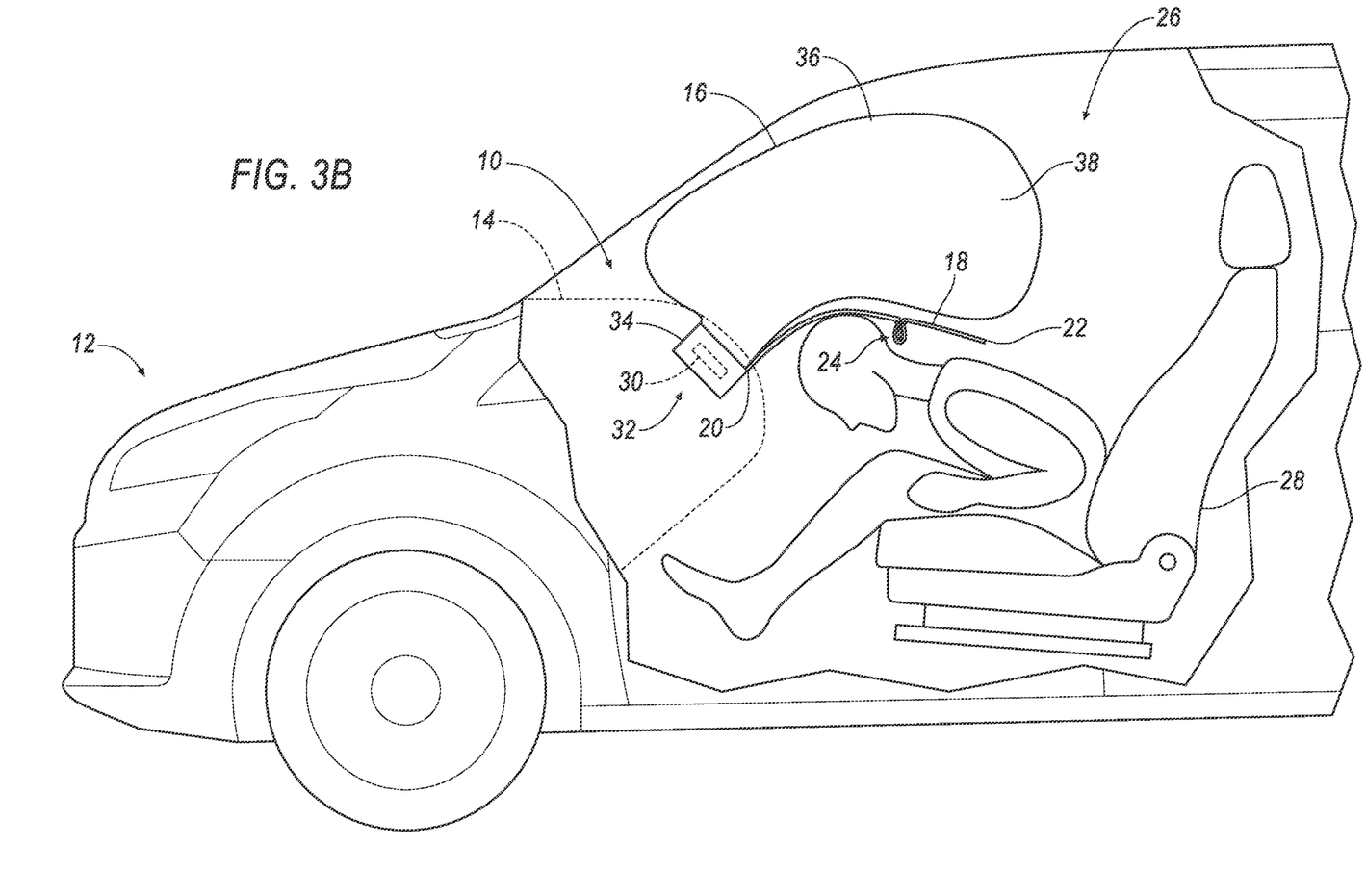
FIG. 3B is a side view of the vehicle with the airbag assembly in the inflated position and the occupant out of position.

The sheet 18 is deployable below the airbag 16. In other words, in the inflated position, the sheet 18 is positioned below the airbag 16. As shown in FIGS. 3A-3B, the sheet 18 is below the airbag 16 both when the occupant is in an upright position as (FIG. 3A) and when the occupant is out of position (FIG. 3B).

The sheet 18 is external to the inflation chamber 38 of the airbag 16. The sheet 18 is uninflatable. In other words, the sheet 18 does not define an inflation chamber 38 that receives the inflation medium from the inflator 30.

The sheet 18 abuts the panel 36. For example, the sheet 18 may abut the panel 36 when the airbag 16 is in the inflated position. As the airbag 16 inflates to the inflated position, the sheet 18 and the panel 36 may slide across each other.

As set forth above, the sheet 18 includes the first end 20 and the second end 22. The first end 20 and the second end 22 are spaced from each other. The sheet 18 is elongated in a direction from the first end 20 to the second end 22.

The first end 20 may be fixed relative to the instrument panel 14. For example, and as shown in the Figures, the first end 20 may be fixed to the housing 34, i.e., directly connected to the housing 34. The first end 20 remains connected to the housing 34 upon deployment of the airbag 16 to the inflated position. The second end 22 is free from the housing 34, i.e., coupled to the housing 34 only through the first end 20 and able to move relative to the housing 34 about the first end 20. The second end 22 is free from the airbag 16 and able to move relative to the airbag 16 during and after deployment to the inflated position.

With reference to FIGS. 2-6, the sheet 18 may include a third end 40 and a fourth end 42. The distance from the first end 20 to the second end 22 may be greater than the distance from the third end 40 to the fourth end 42, i.e., the sheet 18 may be elongated from the first end 20 to the second end 22, as set forth above. The sheet 18 may be rectangular, as shown in the Figures. As other examples, the sheet 18 may be any other suitable shape for example, an oval, a trapezoid, etc.

With reference to FIG. 3A, when the occupant is in the upright position, the airbag 16 inflates toward the occupant and the sheet 18 falls downwardly as the airbag 16 inflates. In this scenario, the panel 36 does not interact with the occupant in order to perform a desired function. With reference to FIG. 3B, when the occupant is out of position, the second end 22 extends over the occupant toward the front seat 28. The airbag 16 deploys upwardly and rearwardly and the sheet 18 guides the airbag 16 to deploy above the sheet 18 and above the occupant.

As set forth above, the reinforcement 24 is on the sheet 18. The reinforcement 24 is elongated on the sheet 18. The reinforcement 24 may be elongated in the cross-vehicle direction along the axis L. As an example, the reinforcement 24 is elongated along the axis of the instrument panel 14. In the alternative or in addition, as another example, the reinforcement 24 may be substantially parallel to the first end 20. As described above, the reinforcement 24 resists bunching of the sheet 18, e.g., along the axis L. This encourages a flat surface-to-surface interaction between the sheet 18 and the panel 36 to distribute friction between the sheet 18 and the panel 36 and to reduce areas of concentrated friction between the sheet 18 and the panel 36.

Figure 4:
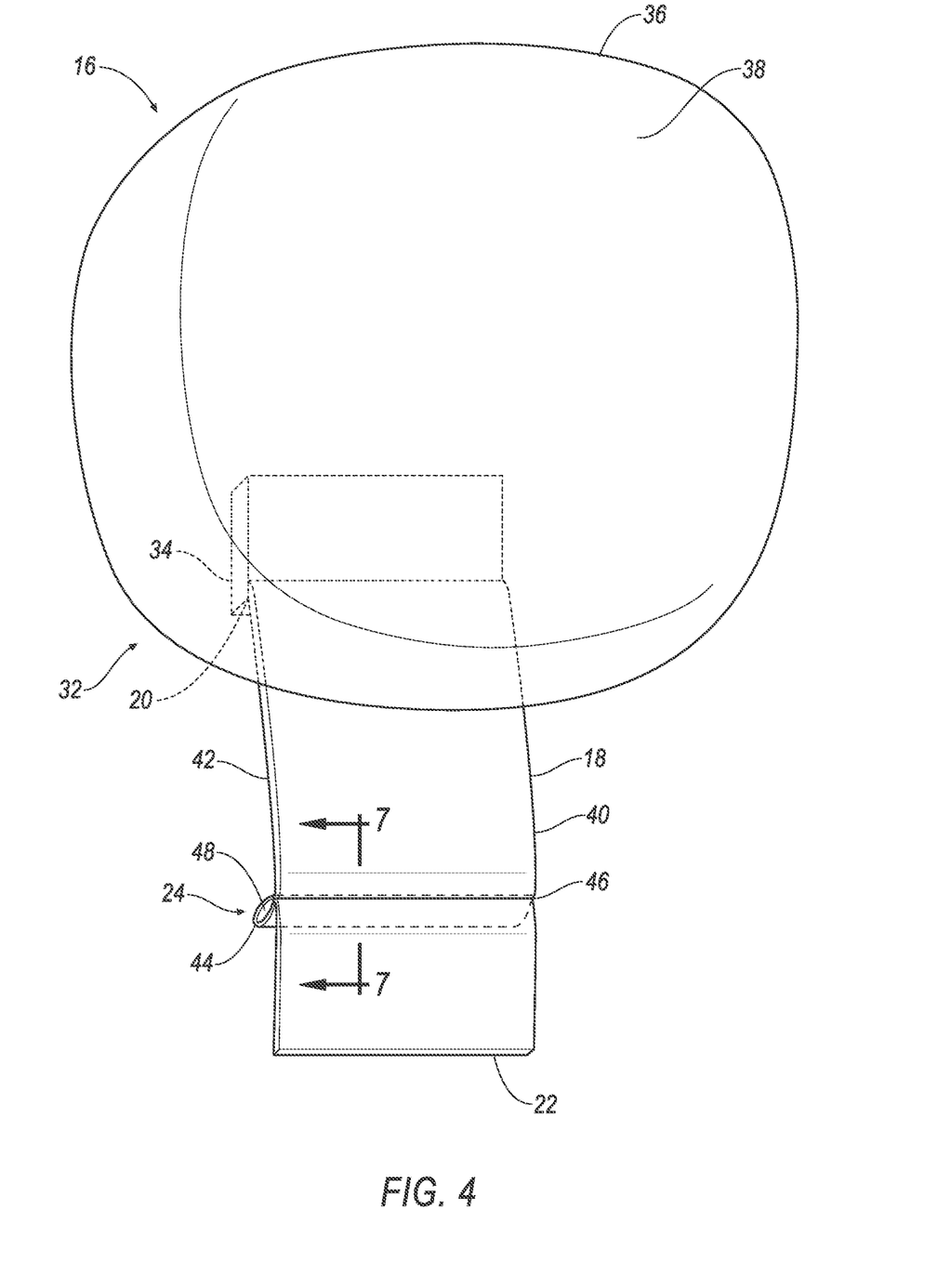
FIG. 4 is a perspective view of the airbag assembly in the inflated position and a reinforcement on the sheet.
Figure 5:
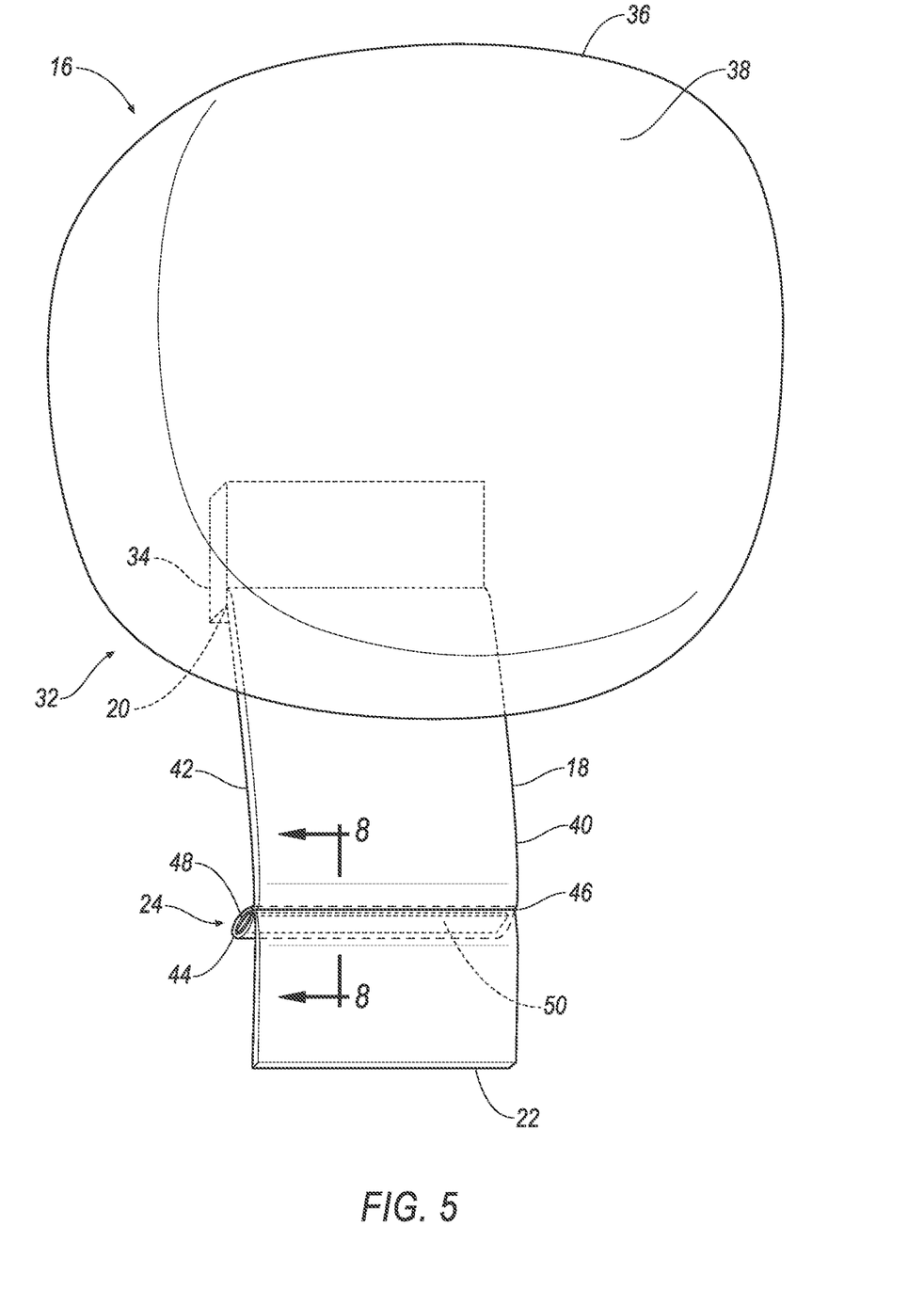
FIG. 5 is a perspective view of the airbag assembly in the inflated position showing another embodiment of the reinforcement including a spine.
Figure 6:
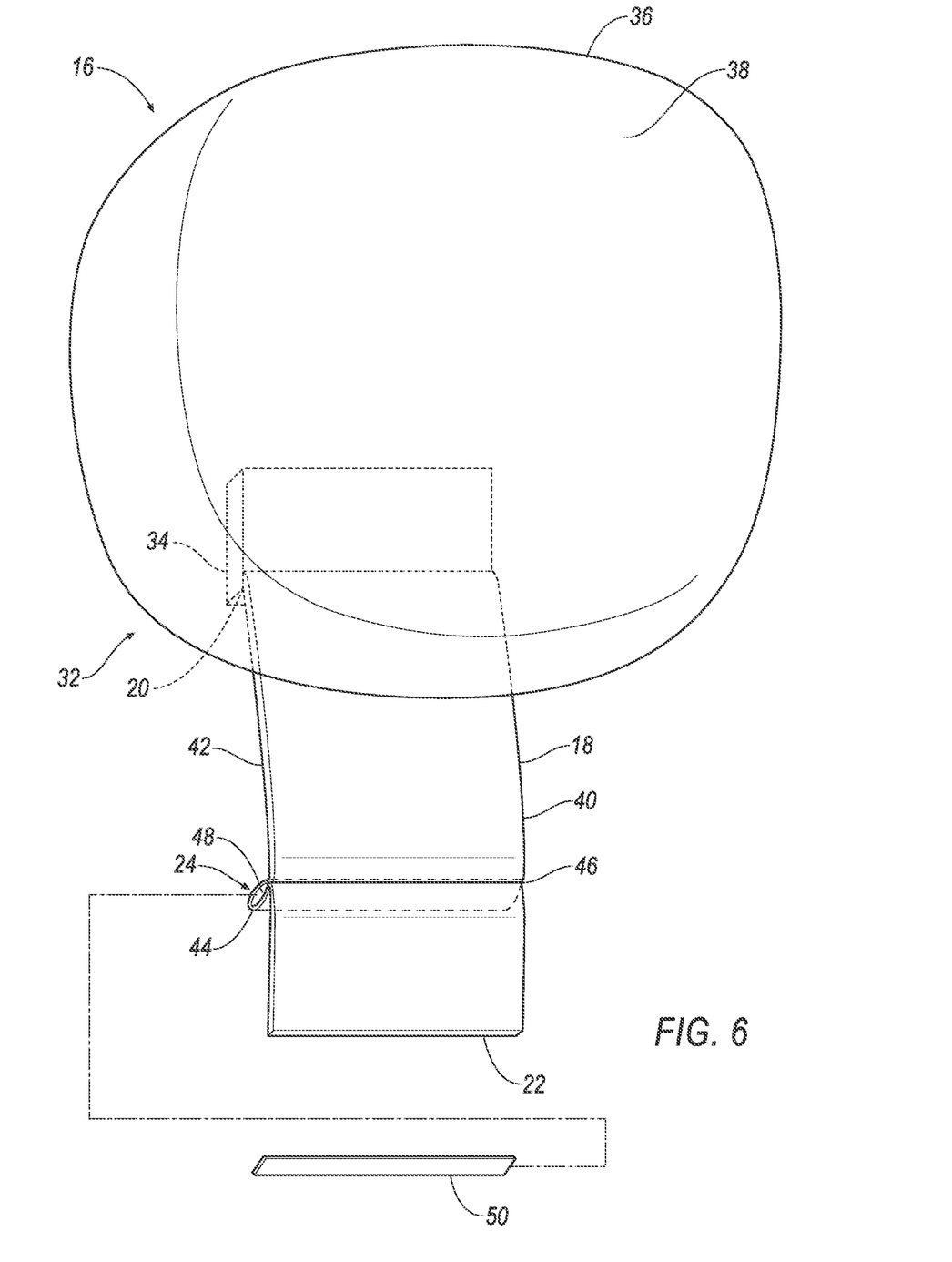
FIG. 6 is a partially exploded view of the airbag assembly in the inflated position with the spine exploded from a pocket.

The reinforcement 24 is spaced from the first end 20 and the second end 22. As one example, as shown in FIGS. 4-6, the reinforcement 24 may be closer to the second end 22 than to the first end 20.

The reinforcement 24 may include a pleat 44 on the sheet 18. For example, the pleat 44 may be a fold that is secured in the material of the sheet 18, e.g., by stitching (as described below and shown in the Figures), adhesive, unitary construction, etc. As another example, the pleat 44 may be formed separately from the sheet 18 and subsequently fixed to the sheet 18, e.g., by stitching, adhesive, etc. The pleat 44 may extend away from the airbag 16, as shown in FIGS. 3A and 3B. In other words, the airbag 16 may abut one side of the sheet 18 and the reinforcement 24 may extend from the opposite side of the sheet 18. The reinforcement 24 may include a row of stitches 46 between the pleat 44 and the sheet 18. In other words, the row of stitches 46 is thread stitched to the sheet 18 to define the pleat 44. The row of stitches 46 may secure the pleat 44.

Figure 7:
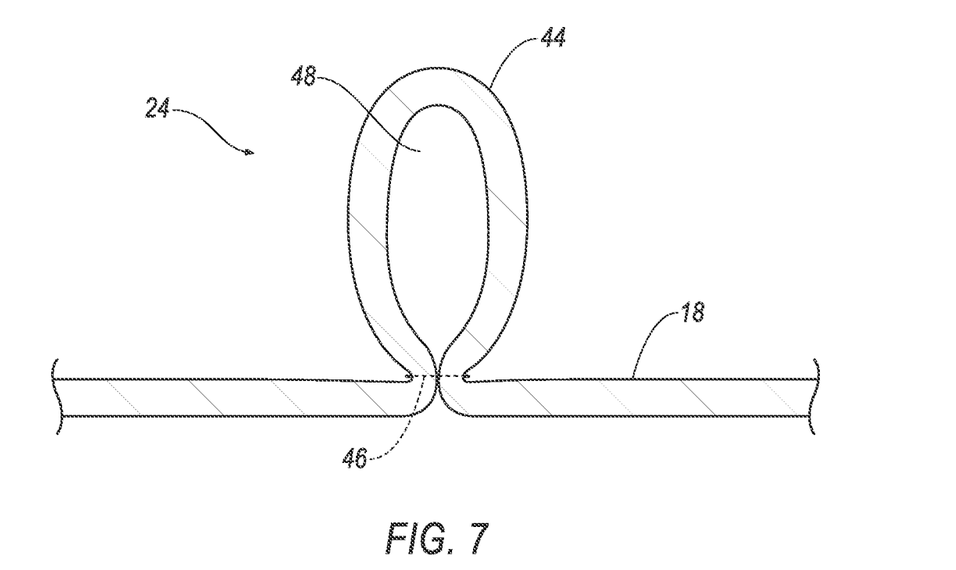
FIG. 7 is a cross-sectional view of the sheet through line 7 in FIG. 4.
Figure 8:
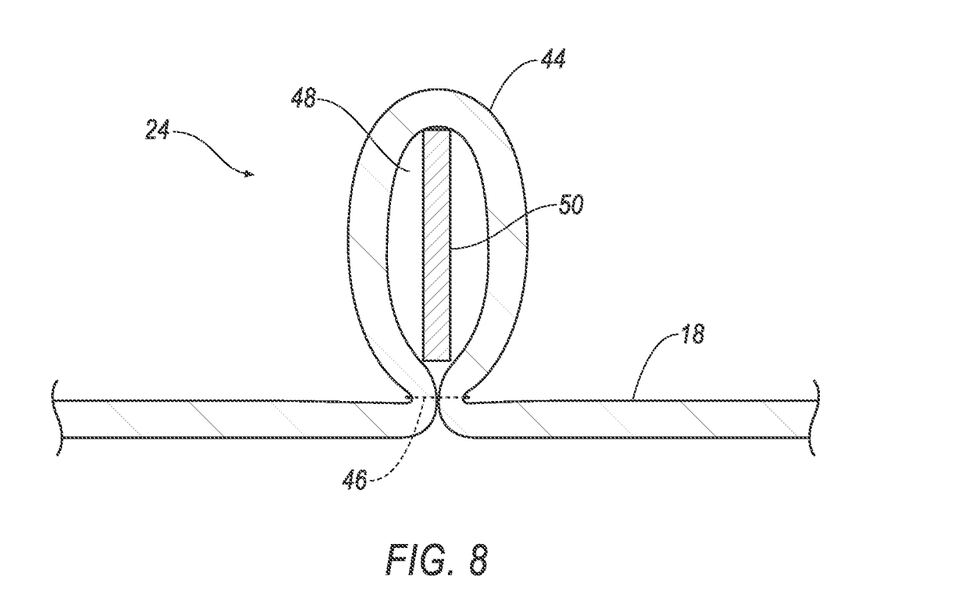
FIG. 8 is a cross-sectional view of the sheet through line 8 in FIG. 5.

The pleat 44 may extend the from the third end 40 to the fourth end 42. The pleat 44 may extend the length of the reinforcement 24. The pleat 44 may be tubular, as shown in FIGS. 7 and 8. The pleat 44 may define a pocket 48. The pocket 48 may be elongated along the on the sheet 18, i.e., along the length of the reinforcement 24.

The pleat 44 creates a resistance to bunching of the sheet 18 as the sheet 18 deploys with the airbag 16. This resistance to bunching encourages flat surface-to-surface interaction between the sheet 18 and the panel 36 to distribute friction between the sheet 18 and the panel 36 and to reduce areas of concentrated friction between the sheet 18 and the panel 36.

With reference to FIGS. 5, 6, and 8, the reinforcement 24 may include a spine 50 in the pocket 48. The spine 50 may be rigid relative to the sheet 18. In other words, the spine 50 is stiffer than the sheet 18. The spine 50 may be polymeric. For example, the spine 50 may be nylon, polypropylene, polyester, etc. The spine 50 may be any other suitable plastic. The pocket 48 may be of an appropriate size to accept a spine 50. The spine 50 stiffens the reinforcement 24 relative to the sheet 18 adding to the reinforcement 24 of the pleat 44 against bunching of the sheet 18.

The airbag 16, the sheet 18, and the pleat 44 may be a woven polymer or any other material. Examples include woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

During a vehicle 12 impact, the airbag 16 is inflated to the inflated position. As shown in FIGS. 2-6, the sheet 18 is deployed with the airbag 16. The reinforcement 24 reinforces the sheet 18. Specifically, since the reinforcement 24 is stiffer than the sheet 18 as the sheet 18 deploys the reinforcement 24 urges the sheet 18 to spread, i.e., discourages bunching.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
    an instrument panel elongated along an axis;
    an airbag supported by the instrument panel;
    a sheet including a first end fixed relative to the instrument panel and a second end free from the instrument panel; and
    a reinforcement on the sheet;
    the reinforcement being substantially parellel to the first end;
    the reinforcement being spaced from the first end and the second end, and the reinforcement being closer to the second end than to the first end;
    the sheet being deployable below the airbag with the second end free from the airbag and the reinforcement elongated along the axis;
    the reinforcement including a pleat on the sheet;
    the pleat defining a pocket and a spine in the pocket;
    the spine being rigid relative to the sheet; and
    the spine being polymeric.

2. The system of claim 1, wherein the sheet is elongated in a direction from the first end to the second end.

3. The system of claim 1, further comprising a row of stitches between the pleat and the sheet.

4. The system of claim 1, wherein the airbag includes an inflation chamber and the sheet is external to the inflation chamber.

5. The system of claim 1, wherein the airbag includes a panel defining an inflation chamber and the sheet is external to the inflation chamber and abuts the panel.

6. An airbag assembly comprising:
    a housing;
    an airbag supported by the housing;
    a sheet including a first end fixed relative to the housing and a second end free from the housing; and
    a reinforcement that is elongated on the sheet;
    the reinforcement being substantially parallel to the first end;
    the reinforcement being spaced from the first end and the second end, and the reinforcement being closer to the second end than to the first end;
    the sheet being deployable below the airbag with the second end free from the airbag;
    the reinforcement including a pleat on the sheet;
    the pleat defining a pocket and a spine in the pocket;
    the spine being rigid relative to the sheet; and
    the spine being polymeric.

7. The airbag assembly of claim 6, further comprising a row of stitches between the pleat and the sheet.

8. The airbag assembly of claim 6, wherein the airbag includes an inflation chamber and the sheet is external to the inflation chamber.

9. The airbag assembly of claim 6, wherein the airbag includes a panel defining an inflation chamber and the sheet is external to the inflation chamber and abuts the panel.

* * * * *